United States Patent
Ki et al.

(10) Patent No.: US 12,173,768 B2
(45) Date of Patent: Dec. 24, 2024

(54) ELASTIC MEMBER AND PUMP ASSEMBLY INCLUDING THE SAME

(71) Applicant: Yonwoo Co., Ltd., Incheon (KR)

(72) Inventors: Joong Hyun Ki, Incheon (KR); Chul Ki Kim, Incheon (KR); Seong Ung Choe, Incheon (KR)

(73) Assignee: YONWOO CO., LTD., Incheon (KR)

( * ) Notice: Subject to any disclaimer, the term of this patent is extended or adjusted under 35 U.S.C. 154(b) by 46 days.

(21) Appl. No.: 18/115,695

(22) Filed: Feb. 28, 2023

(65) Prior Publication Data

US 2023/0204085 A1    Jun. 29, 2023

Related U.S. Application Data

(63) Continuation-in-part of application No. 16/934,398, filed on Jul. 21, 2020, now Pat. No. 11,773,840.

(30) Foreign Application Priority Data

Apr. 29, 2020   (KR) .................. 10-2020-0051963

(51) Int. Cl.
| | |
|---|---|
| F04B 33/00 | (2006.01) |
| F16F 1/36 | (2006.01) |
| F16F 1/373 | (2006.01) |
| B05B 11/10 | (2023.01) |

(52) U.S. Cl.
CPC ............ F16F 1/373 (2013.01); F04B 33/00 (2013.01); F16F 1/3605 (2013.01); B05B 11/1077 (2023.01)

(58) Field of Classification Search
CPC ...... F04B 33/00; F04B 53/12; B05B 11/1035; F16K 1/373; F16K 1/3605

USPC ........................................................... 417/545
See application file for complete search history.

(56) References Cited

U.S. PATENT DOCUMENTS

| | | | |
|---|---|---|---|
| 2,992,843 A | 7/1961 | Smith | |
| 3,276,048 A | 10/1966 | Beckman | |
| 3,815,887 A | 6/1974 | Curtis et al. | |
| 4,846,372 A * | 7/1989 | von Schuckmann | B65D 83/0033 222/492 |
| 5,065,988 A | 11/1991 | Wedell | |
| 5,224,627 A * | 7/1993 | Weag | B05B 11/0054 239/600 |
| 5,238,156 A | 8/1993 | Andris | |
| 5,306,125 A * | 4/1994 | Weag | B05B 11/1035 222/207 |
| 5,819,990 A * | 10/1998 | Cimentepe | B05B 11/1035 222/207 |

(Continued)

FOREIGN PATENT DOCUMENTS

| | | | | |
|---|---|---|---|---|
| GB | 2481465 A | 12/2011 | | |
| JP | 2002239426 A * | 8/2002 | ......... | B05B 11/3035 |

(Continued)

*Primary Examiner* — Thomas Fink
(74) *Attorney, Agent, or Firm* — Bridgeway IP Law Group, PLLC; Sang Ho Lee; Hyun Woo Shin

(57) ABSTRACT

An elastic member for a pump assembly is provided. The pump assembly may include an elastic member having an upper support, a lower support provided under the upper support, and a connection part which connects the upper support and the lower support, and in which peaks and valleys are repeatedly formed in an outward direction to be bent when the elastic member is pressurized.

18 Claims, 5 Drawing Sheets

(56) References Cited

U.S. PATENT DOCUMENTS

| | | |
|---|---|---|
| 7,111,761 B2 | 9/2006 | Masuda |
| 8,616,414 B2 * | 12/2013 | Ciavarella ............. B05B 7/0037 |
| | | 222/207 |
| 2005/0173460 A1 * | 8/2005 | Masuda .............. B05B 11/1094 |
| | | 222/386 |
| 2015/0136810 A1 * | 5/2015 | Ding ................... B05B 11/1074 |
| | | 222/321.9 |
| 2018/0289222 A1 | 10/2018 | Nilsson et al. |
| 2019/0016187 A1 | 1/2019 | Gleu et al. |
| 2020/0046173 A1 * | 2/2020 | Lindstrom ......... B05B 11/0054 |
| 2020/0130002 A1 * | 4/2020 | Baumann ............ B05B 11/0044 |
| 2020/0180017 A1 | 6/2020 | Bilski et al. |
| 2022/0331824 A1 * | 10/2022 | Andrew ................ F16F 9/0418 |
| 2022/0339653 A1 * | 10/2022 | Zhu ..................... B05B 11/1069 |

FOREIGN PATENT DOCUMENTS

| | | | |
|---|---|---|---|
| JP | 3096366 U | 9/2003 | |
| JP | 2004160387 A * | 6/2004 | ......... B05B 11/0027 |
| JP | 2005-273754 A | 10/2005 | |
| JP | 2008-025619 A | 2/2008 | |
| JP | 2008284410 A * | 11/2008 | |
| JP | 2013-086877 A | 5/2013 | |
| KR | 20-0318834 Y1 | 7/2003 | |
| KR | 20-0300273 Y1 | 1/2013 | |
| KR | 10-2116648 B1 | 5/2020 | |
| KR | 10-2120009 B1 | 6/2020 | |
| KR | 10-2120010 B1 | 6/2020 | |
| KR | 10-2123187 B1 | 6/2020 | |
| WO | 91/03321 A1 | 3/1991 | |
| WO | 02/02423 A1 | 1/2002 | |
| WO | 2012/104694 A1 | 8/2012 | |
| WO | 2019/206588 A1 | 10/2019 | |
| WO | 2019/207613 A1 | 10/2019 | |

\* cited by examiner

ELASTIC MEMBER AND PUMP ASSEMBLY INCLUDING THE SAME

CROSS-REFERENCE TO RELATED APPLICATION

This application is a continuation-in-part of U.S. patent application Ser. No. 16/934,398, filed on Jul. 21, 2020, which claims priority to Korean Patent Application No. 10-2020-0051963, filed on Apr. 29, 2020, the entire disclosures of which are incorporated herein by references.

BACKGROUND

1. Field of the Invention

The present disclosure relates to an elastic member and a pump assembly including the same, and more specifically, to an eco-friendly elastic member having a sufficient elastic force and a pump assembly including the same.

2. Discussion of Related Art

Generally, a pump container is configured so that contents therein are discharged to the outside through a pumping operation of a pump assembly coupled to an upper portion of a container main body. The pump container is composed of the container main body in which the contents are stored, the pump assembly which is coupled to the upper portion of the container main body and causes the inside of the container main body to be in a vacuum state to pull up the contents by the pumping operation, and a button part which is located on the pump assembly and ascends and descends according to pressurization by a user to transfer a pressure to the pump assembly.

Here, the pump assembly performs the pumping operation so that the contents stored in the container main body are discharged to the outside, and can include a spring providing an elastic force to the inside for the above-described repetitive pumping operation. Commonly, since the spring is made of a metal material, not only is the manufacturing costs high, but also recycling is not easy, as the pump assembly is made of different materials of plastic and metal, and the different materials should be separated and discarded for recycling.

SUMMARY OF THE INVENTION

The present disclosure is directed to providing an eco-friendly elastic member having a sufficient elastic force and a pump assembly including the same.

Technical problems of the present disclosure are not limited to the above-described problems, and other technical problems which are not mentioned may be apparently understood by those skilled in the art from below.

According to an embodiment of the present disclosure, a pump assembly is provided. The pump assembly may include an elastic member may include a first support, a second support, and a connection part, the first support having an inner side wall of the first support and an outer side wall of the first support, the second support having a multi-step structure, wherein each step of the multi-step structure has an inner side wall and an outer side wall, and wherein a diameter of the each step of the multi-step structure increases towards a distal portion of the elastic member, and the connection part connecting the first support and the second support and comprising a plurality of peaks and valleys alternatingly disposed in an outward direction, wherein the plurality of peaks and valleys are configured to be bent assisting a pump action of the pump assembly when the elastic member is pressurized along an axial direction of the elastic member, wherein the elastic member has a through hole penetrating the first support, the connection part, and the second support along the axial direction of the elastic member, and wherein a space is defined within the through hole configured to accommodate the pump assembly.

In addition, the elastic member is configured to be accommodated in the pump assembly in a partially compressed state.

In addition, the elastic member is formed of at least one among polyetheretherketone (PEEK), polycarbonate (PC), polyoxymethylene (POM), polyketone (POK), polybutylene terephthalate (PBT), polypropylene (PP), polyethylene (PE), polyoxypropylene (POP), a polyolefin elastomer (POE), and ethylene octene/butene copolymers.

In addition, sizes of each of the plurality of peaks and valleys increase in a longitudinal direction.

In addition, the connection part is a bellows type, wherein the connection part is defined along a circumference of the elastic member, and wherein a circumferential surface of the connection part is sealed.

In addition, at least one of the first support and the second support may include at least one air path configured to release air when the elastic member is compressed.

In addition, the second support may include a two-step structure, wherein the two-step structure has a first step structure and a second step structure, wherein the first step structure is defined on a distal portion of the two-step structure and has an outer side wall and an inner side wall, and wherein the second step structure is defined on a closer portion of the two-step structure and has an outer side wall and an inner side wall.

In addition, each step of the two-step structure may include a step-through-hole having a buffer space inside the first step structure, and the second step structure is inwardly bent to the buffer space when an elastic force is horizontally or vertically pressured.

In addition, a diameter of the outer side wall of the first step structure is greater than a diameter of a peak of the plurality of peaks and valleys.

In addition, a horizontal margin is created by a difference between the diameter of the outer side wall of the first step structure and the diameter of the peak of the plurality of peaks and valleys, and wherein the connection part is compressed or decompressed without interference of other components of the pump assembly by being compressed or decompressed in the horizontal margin.

In addition, a distance from the outer side wall of the first step structure to the inner side wall of the second step structure is greater than a height of the two-step structure.

In addition, a distance from the outer side wall to the inner side wall of the first step structure is greater than a height of the first step structure.

In addition, the pump assembly may further include a cylinder vertically open and having a hollow therein, a seal cap disposed on an inner wall of the cylinder, a sealing part at least partially inserted into the cylinder and configured to restrain an ascent of the seal cap, a piston rod having an inlet opened and closed by the seal cap disposed in a lower end of the piston rod and a path connected to the inlet disposed at an upper end of the piston rod, and a stem coupled to the piston rod and configured to ascend and descend together with the piston rod, wherein the elastic member is disposed between the stem and the sealing part and is configured to provide an elastic force to the stem from the sealing part.

In addition, a blade part is defined by protruding outward along a circumference of an upper end of the stem configured to support an upper end of the elastic member, wherein a downwardly bent portion is defined along a circumference of the blade part and supports the elastic member configured to prevent separation of the elastic member, and wherein at least one air path is defined on the blade part configured to release compression and expansion of inner air generated during compression and decompression of the elastic member.

In addition, the air path of the blade part is defined on at least one region of the blade part being open.

In addition, the sealing part may include a sidewall disposed to the cylinder and is configured to prevent an outward separation of the elastic member, and a base part defined on a lower end of the side wall, wherein an upper surface of the base part supports a lower end of the elastic member.

In addition, the cylinder may include an inlet communicating with a container and a valve preventing backflow, and wherein the valve opens the inlet when an inner pressure of the cylinder changes to a negative pressure.

In addition, a lower portion of the piston rod is surrounded by an inner surface of the seal cap sealing the inlet of the piston rod and an upper portion of the piston rod is connected to the stem.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
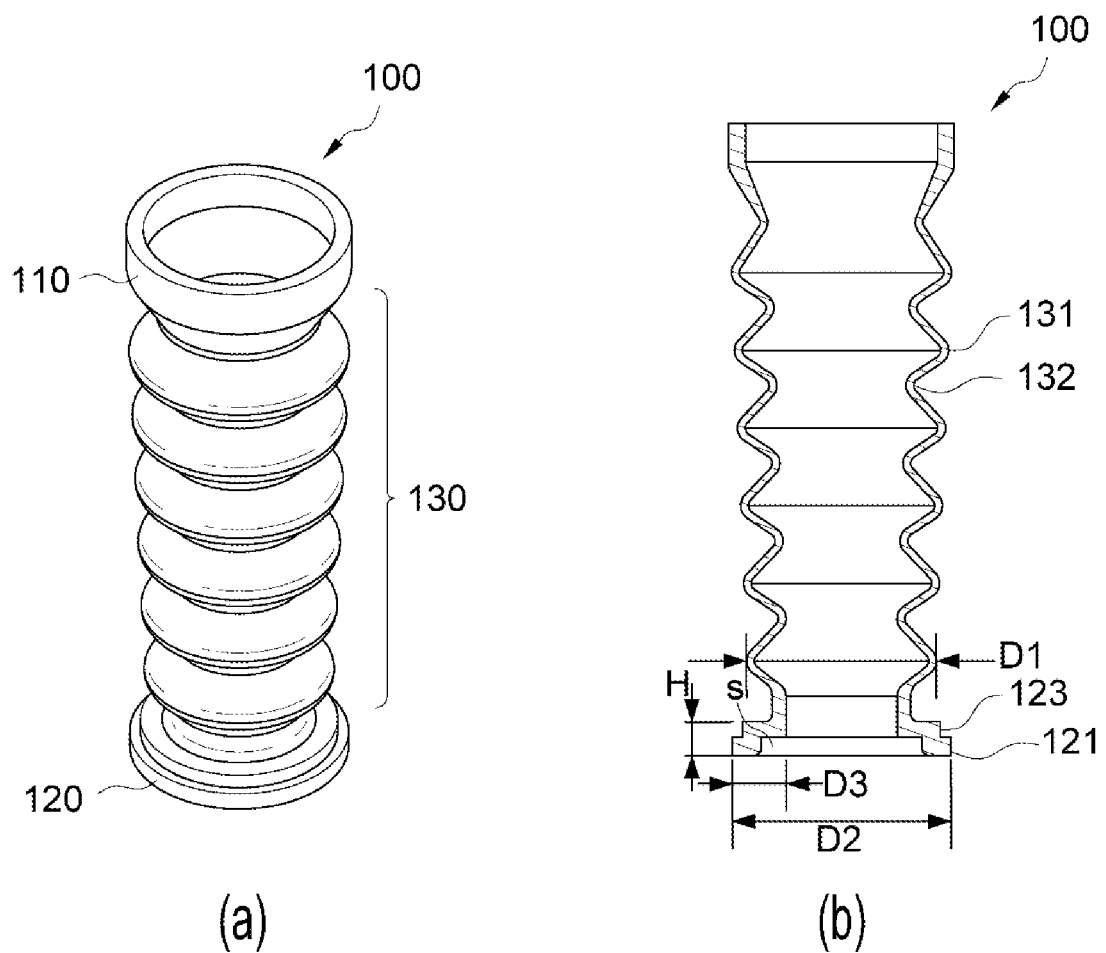
FIG. 1 illustrates an elastic member according to an embodiment of the present disclosure.

Hereinafter, exemplary embodiments according to the present disclosure will be described in detail with reference to the accompanying drawings. Further, a method of configuring and using a device according to the embodiment of the present disclosure will be described in detail with reference to disclosures in the accompanying drawings. The same reference numerals or numerals provided in the drawings denote components or elements which perform substantially the same function. The following vertical and lateral directions are directions based on the drawings, and the scope of the present disclosure is not limited to the directions.

Although the terms including ordinal numbers "first," "second," and the like may be used herein to describe various elements, the elements are not limited by the terms. The terms may be used only to distinguish one element from another. For example, 'a first element' could be referred to as 'a second element', and similarly, 'a second element' could be referred to as 'a first element' without departing from the scope of the present disclosure. The term "and/or" includes any combination of a plurality of related items or one of a plurality of related items.

Terms used in the present disclosure are used solely to describe the embodiments and not to limit the present disclosure. The singular form is intended to also include the plural form, unless the context clearly indicates otherwise. It should be further understood that the terms "include," "including," "provide," "providing," "have," and/or "having" specify the presence of stated features, integers, steps, operations, elements, components, and/or groups thereof, but do not preclude the presence or addition of one or more other features, integers, steps, operations, elements, components, and/or groups thereof.

Throughout the specification, a case in which a certain part is mentioned as being "connected" to another part includes not only a case in which the part is "directly connected" to the other part, but also a case in which the part is "electrically connected" to the other part with another element therebetween. Further, a case in which the certain part is mentioned as "including" a certain component refers to a case in which another component may be further provided unless otherwise defined, not a case in which another component is excluded.

An elastic member may be compressed and decompressed in a longitudinal direction to exert an elastic force. The elastic member may use the elastic force so that a pumping operation may be performed in a pump assembly, and the pump assembly may suction and discharge contents through the pumping operation.

In one embodiment, the elastic member may have a length greater than a stroke distance of a piston rod of the pump assembly. The length is a length in a steady state in which the elastic member is not compressed or elongated, and for example, the length may be 1.4 to 3 times the stroke distance of the piston rod. However, the present disclosure is not limited thereto, and the length may be variously set according to the material, shape, and the like of the elastic member. That is, in consideration of the deformation that will be caused due to repeated compression, the length of the elastic member may be determined so that a compression distance of the elastic member after deformation is the same as or similar to the stroke distance of the piston rod.

In one embodiment, the elastic member may be accommodated in the pump assembly in a partially compressed state. To this end, the elastic member may have a length greater than that of an accommodation space (for example, a space between a stem and a sealing part) of the pump assembly. For example, the elastic member may have a length of 1.3 to 3 times or 1.7 to 2.2 times a length of each accommodation space, but is not limited thereto. As described above, since the elastic member is partially compressed to be accommodated in the pump assembly, even when the elastic member is deformed to decrease a recovery rate by repeated compression, the elastic member may be stably disposed without a change in size of the accommodation space which accommodates the elastic member.

In one embodiment, the elastic member may be provided as a plurality. In this case, a plurality of elastic members may be assembled in a longitudinal direction and provided in the pump assembly.

In one embodiment, at least a portion of the elastic member may be made of a soft plastic material. For example, a material forming the elastic member includes polyetheretherketone (PEEK), polycarbonate (PC), polyoxymethylene (POM), polyketone (POK), polybutylene terephthalate (PBT), polypropylene (PP), polyethylene (PE), polyoxypropylene (POP), an elastomer, a polyolefin elastomer (POE), a copolymer, ethylene octene/butene copolymers, or the like. However, the present disclosure is not limited thereto. As described above, since the elastic member is formed of the soft plastic material, the elastic member may be easily manufactured, and manufacturing costs may be reduced in comparison with a spring made of a conventional metal material. Further, since the elastic member weighs less than a spring formed of the conventional metal material, the weight of the pump assembly and the container provided with the elastic member may be reduced, and thus it is easy to carry and may be more convenient to use. Further, the pump assembly becomes more eco-friendly by solving the problem of having to separate and discard the elastic member with other components of the pump assembly.

In one embodiment, the elastic member may be manufactured by injection molding. Accordingly, the injection molding may provide relatively stable performance in comparison with other manufacturing methods such as blow molding and the like. For example, when the elastic member is a bellows type, commonly, the elastic member is manufactured by blow molding, and in this case, there is a problem in that the thickness of the elastic member is not uniformly formed. However, in the case of the injection molding, since the above-described problem of non-uniformity does not occur, a defect rate is reduced, and an asymmetric elasticity problem may also be solved.

FIG. 1 illustrates an elastic member according to an embodiment of the present disclosure.

Specifically, FIG. 1(*a*) is a perspective view of an elastic member 100, and FIG. 1(*b*) is a cross-sectional view of the elastic member 100.

Referring to FIGS. 1(*a*) and 1(*b*), the elastic member 100 may include an upper support 110, a lower support 120 provided under the upper support 110, and at least one connection part 130 which connects the upper support 110 and the lower support 120, and is bent when the elastic member 100 is pressurized.

The upper support 110 may support an upper end of the connection part 130. When the elastic member 100 is pressurized, the upper support 110 may transfer a pressure to the connection part 130 while descending, and when the pressure is released, the upper support 110 may be restored by an elastic force of the connection part 130 while ascending. The lower support 120 may support a lower end of the connection part 130. The lower support 120 supports the connection part 130 in a pump assembly 300 without ascending so that the elastic force of the connection part 130 may be directed toward the upper support 110.

At least one of the upper support 110 and the lower support 120 (especially, the lower support 120) may have the multi-step structure.

In one embodiment, the multi-step structure comprises a first step structure 121 having a first through hole and a second step structure 123 having a second through hole. A diameter of the first step structure 121 is greater than a diameter of the second step structure 123, and the first step structure 121 is located at a more distal portion of the elastic member 100 compared to the second step structure 123. A diameter of the first through hole is greater than that of the second through hole, and the first step is located at a more distal portion of the elastic member 100 compared to the second step. The first through hole and the second through hole are connected from one another.

The first step structure 121 may support the elastic member 100 adhering to other components of the pump assembly 300. A diameter of each step of the multi-step structure increases towards a distal portion of the elastic member 100. Thus, a diameter D2 of the first step structure 121 is greater than a diameter D1 of a peak 131. In this case, the connection part 130 may be compressed and decompressed without interference of any other components or space of the pump assembly 300 by being compressed and decompressed in the space created by the difference of the diameter D2 of the first step structure 121 and the diameter D1 of the peak 131.

A diameter of each step through hole of each multi-step structure increases towards the distal portion of the elastic member 100. Thus, the diameter of the first through hole is greater than that of the second through hole. The multi-step structure is slantly defined towards the distal portion of the elastic member 100 so that the multi-step structure has a buffer space s inside the first through hole. The buffer space s may keep the elastic member 100 in balance and positionally stable by making the elastic member 100 inwardly bent to the buffer space s when a pressure is horizontally or vertically applied to the elastic member 100.

In the other embodiment, a horizontal length D3 of the multi-step structure is greater than a height H of the multi-step structure. In this case, the multi-step structure may support the elastic member 100 more stably.

A hollow may be formed inward the upper support 110 and the lower support 120. The hollow of the elastic member 100 may allow a stem 350 and the like of the pump assembly 300 to be located therein, and the hollow of the elastic member 100 may allow the elastic member 100 to be located inside the pump assembly 300. In this case, each of the upper support 110 and the lower support 120 may have, for example, a circular ring shape, but is not limited thereto.

The connection part 130 may elastically connect the upper support 110 and the lower support 120. In this case, peaks 131 protruding outward and valleys 132 recessed inward from the peaks 131 may be repeatedly formed in the connection part 130 in a longitudinal direction. When the elastic member 100 is pressurized, the connection part 130 may generate an elastic force while being bent (that is, elastic compression). Further, in this state, when pressurization is released, bending of the connection part 130 is released by the elastic force and thus the connection part 130 may be restored to an original state.

The connection part 130 of the elastic member 100 connects the upper support 110 and the lower support 120, and may be formed in a bellows type. Specifically, one connection part 130 is provided along a circumference of the elastic member 100, and the peaks 131 protruding outward and the valleys 132 recessed inward from the peaks 131 may be repeatedly formed in the connection part 130 in the longitudinal direction to seal a side surface.

According to the embodiment, the upper support 110, the lower support 120, and the connection part 130 may be formed of the same material or different materials. For example, the upper support 110 and the lower support 120 may be formed of a rigid material in comparison with the connection part 130. Further, for example, the connection part 130 may be formed of a material having a relatively greater elastic force in comparison with the upper support 110 and the lower support 120.

In the other embodiment, the elastic member 100 may be configured as a plurality. That is, a plurality of elastic members 100 may be continuously disposed in the pump assembly 300, and may be supported by the upper support 110 and/or the lower support 120. As described above, an entire length of the elastic member 100 may be variously changed through a combination of the plurality of elastic members 100.

In the other embodiment, at least one of a coupling protrusion and a coupling groove may be formed on at least one of an upper surface of the upper support 110 and a lower surface of the lower support 120. When the elastic member 100 is configured as a plurality, the elastic members 100 may be connected by coupling between the coupling protrusion and the coupling groove. For example, since the coupling protrusion is downwardly formed on the lower surface of the lower support 120, and the coupling groove is upwardly formed in the upper surface of the upper support 110, the plurality of elastic members 100 may be assembled in a longitudinal direction.

In the other embodiment, in the elastic member 100, sizes of the peak 131 and the valley 132 may increase along the longitudinal direction. For example, the sizes of the peak 131 and the valley 132 may increase more and more from the upper support 110 to the lower support 120. Since the sizes of the peak 131 and the valley 132 are formed larger toward the lower support 120, the elastic member 100 may be more stably disposed in the pump assembly 300. However, this is exemplary, and in another example, the sizes of the peak 131 and the valley 132 may increase more and more from the lower support 120 to the upper support 110. According to the embodiment, the elastic member 100 may be manufactured through injection molding, and in this case, the sizes of the peak 131 and the valley 132 of the elastic member 100 increase in a specific direction so that a mold used in injection may be easily separated.

In the other embodiment, at least one air path for releasing air when the elastic member 100 is compressed may be formed in at least one of the upper support 110 and the lower support 120 of the elastic member 100. At least one of the upper surface of the upper support 110 and the lower surface of the lower support 120 may protrude and/or be recessed in the longitudinal direction to form the air path. The protruding and/or recessed regions may serve as a coupling protrusion and/or a coupling groove when correspondingly formed.

The shape of the elastic member 100 shown in FIG. 1 is exemplary, and various shapes may be applied according to embodiments to which the present disclosure is applied.

Figure 2:
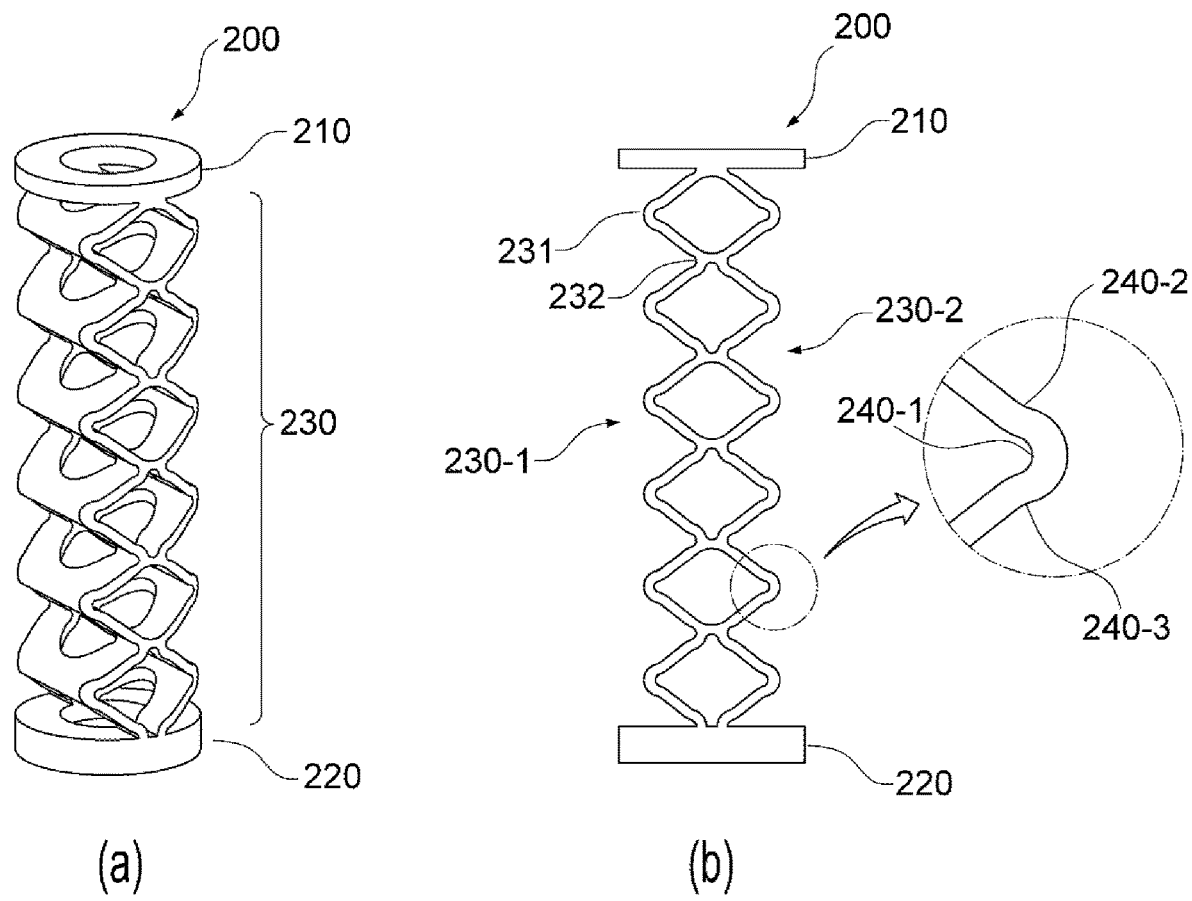
FIG. 2 illustrates an elastic member according to an embodiment of the present disclosure.

FIG. 2 illustrates an elastic member according to an embodiment of the present disclosure.

Specifically, FIG. 2(*a*) is a perspective view of an elastic member 200, and FIG. 2(*b*) is a front view of the elastic member 200 and also includes a front view of an enlarged section of the elastic member 200.

The elastic member 200 in FIG. 2 is described in the same manner as the elastic member 100 in FIG. 1, and hereinafter, overlapping descriptions will be omitted.

A first connection part 230-1 and a second connection part 230-2 among connection parts 230 of the elastic member 200 may be correspondingly formed in opposite directions, and valleys 232 corresponding to the first connection part 230-1 and the second connection part 230-2 may be connected so that the first connection part 230-1 and the second connection part 230-2 may be integrally formed. Accordingly, the first connection part 230-1 and the second connection part 230-2 of the elastic member 200 may be uniformly compressed. However, this is exemplary, and one or three or more connection parts 230 may be formed in the elastic member 200 according to the embodiments.

In the other embodiment, an outermost first inflection point 240-1, and a second inflection point 240-2 and a third inflection point 240-3 in a vertical direction toward the inside of the first inflection point 240-1 may be formed in a peak 231 of the connection part 230. When the elastic member 200 is pressurized, bending may be performed on the basis of the first inflection point 240-1 to the third inflection point 240-3 during compression of the elastic member 200. A load due to the bending may be dispersed to the plurality of inflection points 240-1, 240-2, and 240-3.

In the other embodiment, a restriction part protruding to another valley 232 adjacent thereto (in a longitudinal direction) may be formed in at least one valley among the valleys 232 of the elastic member 200. When the elastic member 200 is compressed, the restriction part may restrict a compression distance of the elastic member 200 to prevent performance degradation due to excessive compression by coming into contact with the valley 232 adjacent thereto or the restriction part of the adjacent valley 232.

Figure 3A:
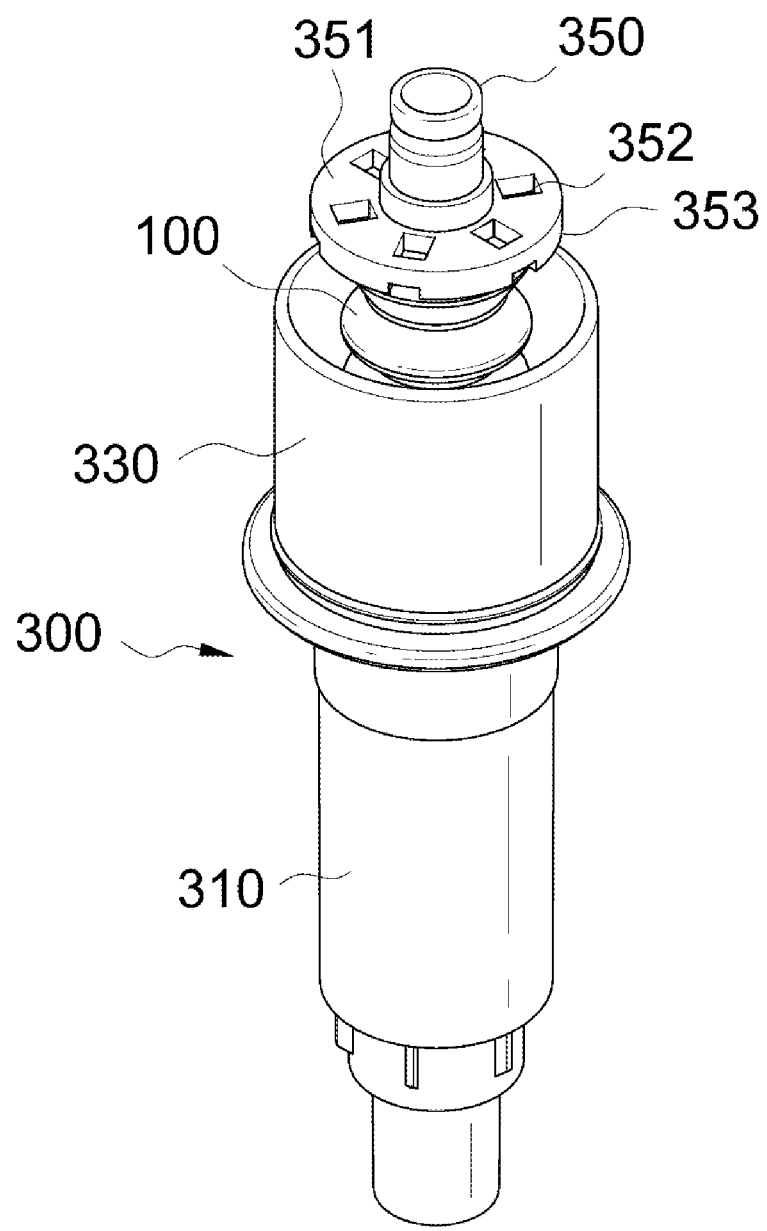
FIG. 3A is a perspective view of a pump assembly according to the embodiment of the present disclosure.
Figure 3B:
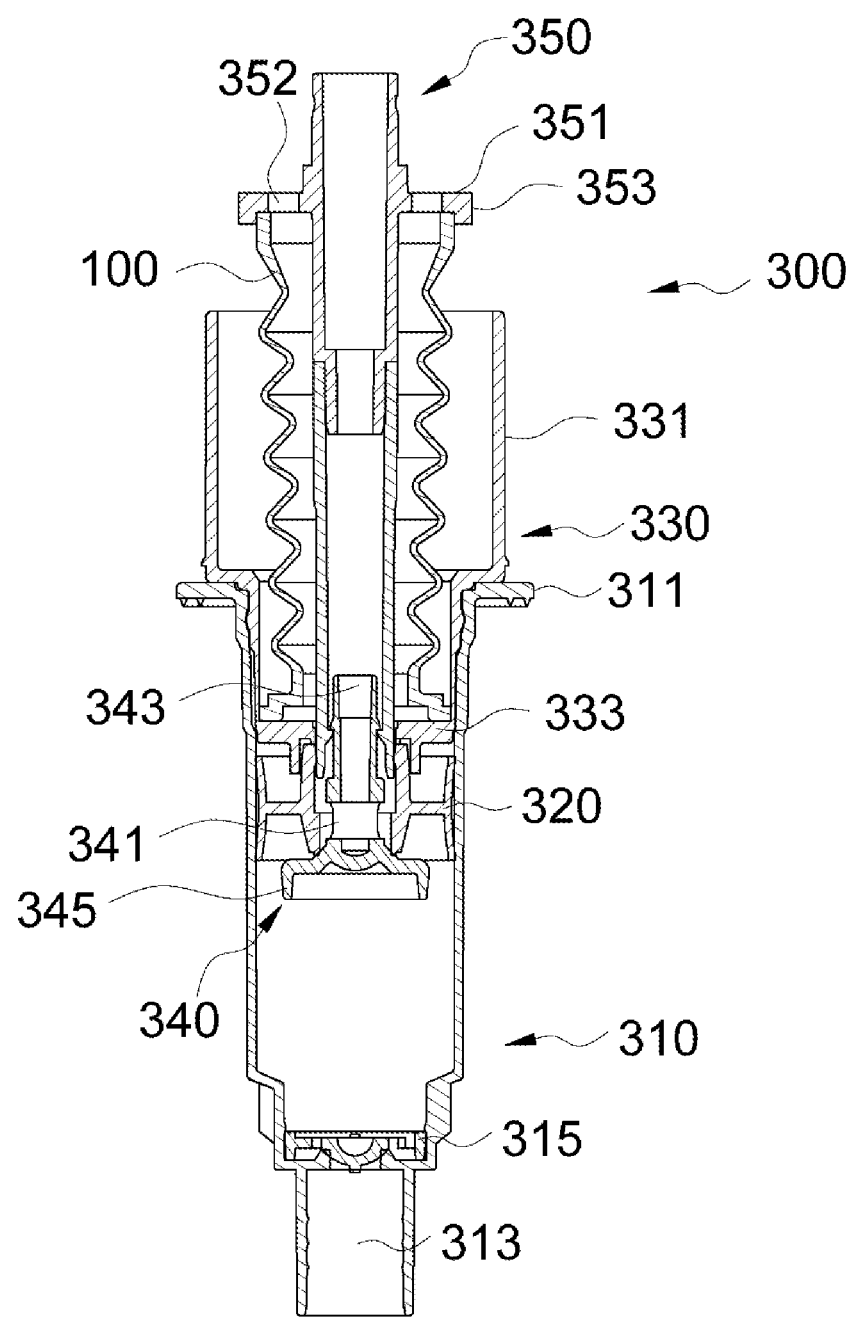
FIG. 3B is a cross-sectional view of the pump assembly according to the embodiment of the present disclosure.

FIG. 3A is a perspective view of a pump assembly 300 according to the embodiment of the present disclosure, and FIG. 3B is a cross-sectional view of the pump assembly 300 according to the embodiment of the present disclosure.

FIGS. 3A and 3B illustrate that a pump assembly 300 includes the elastic member 100 in FIG. 1, but this is for a simple description, and the pump assembly 300 may be provided with the elastic member 200 in FIG. 2 or an elastic member according to another embodiment of the present disclosure.

Referring to FIGS. 3A and 3B, the pump assembly 300 is provided to receive an external force from a user to cause a pressure change therein, and then suction and discharge contents. Specifically, the pump assembly may include a cylinder 310, a seal cap 320, a sealing part 330, a piston rod 340, a stem 350, a blade part 351, and the elastic member 100.

The cylinder 310 may be vertically open to provide a space through which contents are introduced and discharged. The cylinder 310 may be located inside a spout part 411 of a container 400, and formed with an outward seating blade 311 to be seated on the spout part 411 of the container 400. A lower end of the cylinder 310 may be formed to extend toward the inside of the container 400, and an inlet 313 which communicates with the container 400 may be formed. A valve 315 may be formed at or adjacent to the inlet 313. The valve 315 is a valve which prevents backflow, and may seal the inlet 313 when an inner pressure of the cylinder 310 is a positive pressure, and may open the inlet 313 when the inner pressure of the cylinder 310 changes to a negative pressure.

The seal cap 320 is provided to open and close the piston rod 340, wherein an outer surface may come into close contact with an inner wall of the cylinder 310 and an inner surface may come into close contact with the piston rod 340. A lower end of the inner surface of the seal cap 320 may come into close contact with the support part 345 of the piston rod 340 to seal an piston-inlet 341 of the piston rod 340, and when the piston rod 340 descends relative to the seal cap 320, the lower end of the seal cap 320 becomes further from the support part 345 of the piston rod 340, and thus the piston-inlet 341 may be open to communicate with the inside of the cylinder 310.

The sealing part 330 is coupled to an upper end of the cylinder 310, and may be configured so that a lower end of the sealing part 330 may inwardly extend so as to be partially inserted into the cylinder 310. Specifically, the sealing part 330 may include a sidewall 331 which comes into contact with the cylinder 310, and a base part 333 which is inwardly formed from a lower end of the sidewall 331. The ascent of the seal cap 320 may be restrained by a bottom surface of the base part 333, or alternatively, by a protrusion formed on the bottom surface of the base part 333. Further, a lower end of the elastic member 100 may be supported by an upper surface of the base part 333, and separation of the elastic member 100 to the outside may be prevented by the sidewall 331. According to the embodiment, the lower end of the elastic member 100 may be disposed close to the sidewall 331.

In the other embodiment, at least one lower lead may be formed on the upper surface of the base part 333 of the sealing part 330. Since the lower lead comes into contact with the lower end of the elastic member 100, an air path may be formed through the lower lead. When the elastic member 100 is implemented in a bellows type, compression and expansion of inner air generated during compression and decompression of the elastic member 100 may be released by the air path.

The piston rod 340 is provided in the cylinder 310, wherein a lower side may be surrounded by the seal cap 320, and an upper side may be connected to the stem 350. The piston rod 340 may have a hollow pipe shape, an piston-inlet 341 opened and closed by the seal cap 320 may be formed in a lower side of the piston rod 340, and an outlet 343 through which the contents introduced through the piston-inlet 341 are discharged may be formed in an upper side of the piston rod 340. Further, since the support part 345 is formed on a lower end of the piston rod 340, when a lower end of the inner surface of the seal cap 320 comes into close contact with the support part 345, the piston-inlet 341 may be sealed from an inner space of the cylinder 310. The piston rod 340 may vertically move in the cylinder 310 due to the stem 350. When the piston rod 340 moves downward, since the lower end of the inner surface of the seal cap 320 is spaced apart from the support part 345 and thus the piston-inlet 341 is open, the contents in the cylinder 310 may be introduced into the piston rod 340. When the piston rod 340 continuously moves, the contents may be discharged through the outlet 343, and then may be discharged through a discharge hole 431 of the nozzle 430 by passing through the stem 350. When the piston rod 340 moves upward, the cylinder 310 may seal the piston-inlet 341 of the piston rod 340, and the negative pressure is generated in the cylinder 310, and thus the contents in the container part 410 may be introduced into the cylinder 310.

The stem 350 may be coupled to the piston rod 340 to ascend and descend together with the piston rod 340. Specifically, the stem 350 may descend the piston rod 340 while descending when an external force is applied through, for example, a nozzle 430 or the like, and when the external force is removed, the stem 350 may ascend the piston rod 340 while ascending. A blade part 351 protruding outward along a circumference of the stem 350 may be formed on an upper end of the stem 350. The upper end of the elastic member 100 may be supported by a bottom surface of the blade part 351. A length of an accommodation space of the elastic member 100 may be defined by a length from the bottom surface of the blade part 351 to the upper surface of the base part of the sealing part 330.

In the other embodiment, a downwardly bent portion 353 may be formed at an outer side of the blade part 351. The separation of the elastic member 100 may be prevented by the downwardly bent portion 353.

In the other embodiment, at least one air path 352 may be formed at blade part 351. When the elastic member 100 is implemented in the bellows type, compression and expansion of inner air generated during compression and decompression of the elastic member 100 may be released by the air path 352. For example, at least one upper lead may be formed on the bottom surface of the blade part 351. Since the upper lead comes into contact with the upper end of the elastic member 100, the air path may be formed through the upper lead. For example, an air path 352 may be formed by at least region of the blade part 351 being open. The elastic member 100 is provided to restore a position of the piston rod 340, the lower support 120 may be supported by the sealing part 330 (for example, the upper surface of the base part or the like), and the upper support 110 may be supported by the stem 350. Here, a lower end of the stem 350 may be coupled to the piston rod 340 and the stem 350 is formed to be vertically open, and thus the contents introduced from the piston rod 340 may move upward. When a user pressurizes the pump assembly 300, the connection part 130 may be compressed while the upper support 110 and the stem 350 move downward. In this case, the piston rod 340 coupled to the stem 350 may also move downward. Further, when the user releases pressurization, an elastic force of the connection part 130 may restore the upper support 110 and the stem 350 in an upward direction. In this case, the piston rod 340 coupled to the stem 350 may also move upward.

In the other embodiment, the length from the bottom surface of the blade part 351 to the upper surface of the base part 333 of the sealing part 330 may be smaller than a length of the elastic member 100. That is, the elastic member 100 may be compressed to a length smaller than a length in a stable state to be accommodated in the pump assembly 300.

Figure 4:
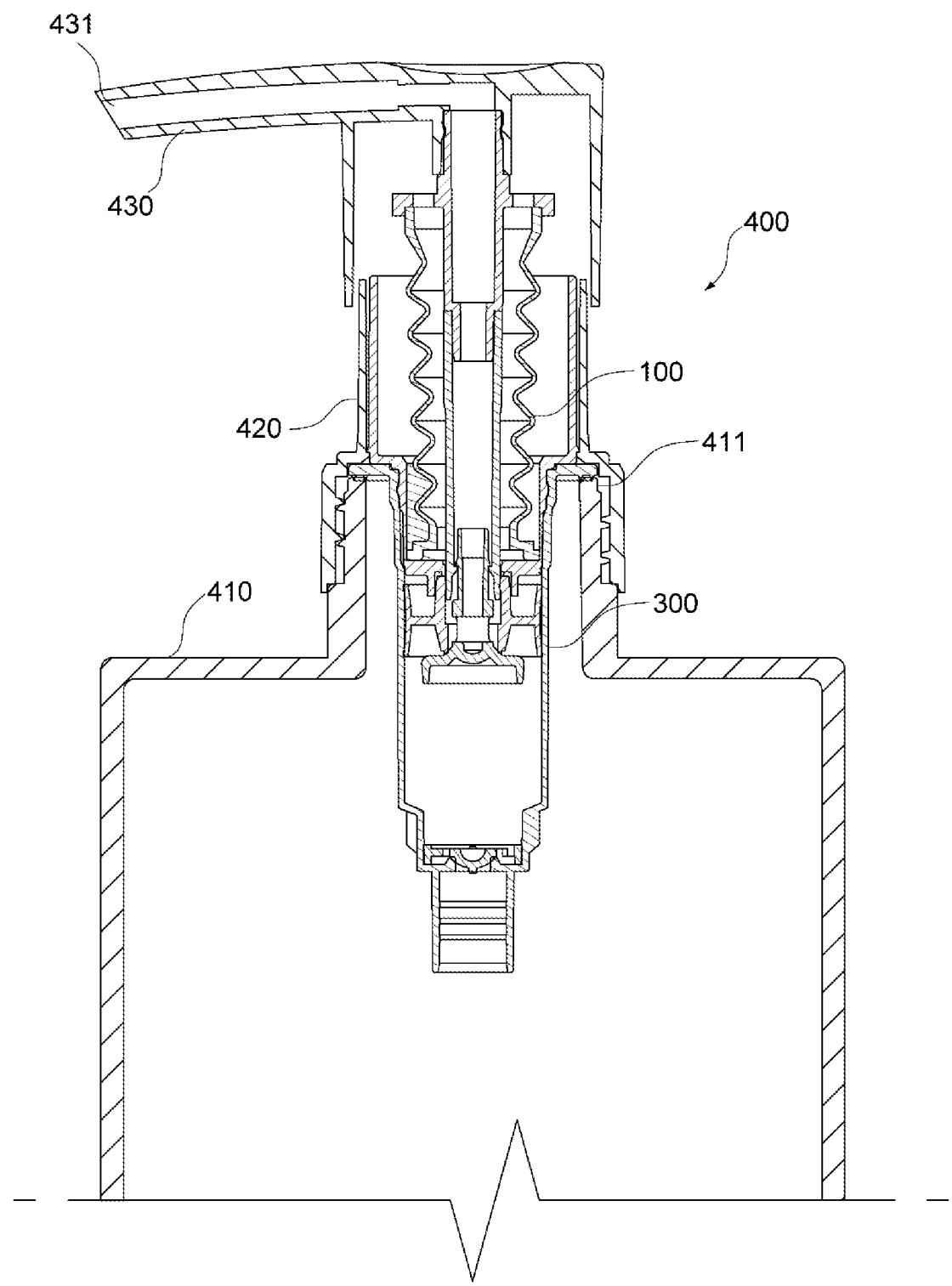
FIG. 4 is a cross-sectional view of a content container according to the embodiment of the present disclosure.

FIG. 4 is a cross-sectional view of a content container 400 according to the embodiment of the present disclosure.

Referring to FIG. 4, a content container 400 may include a container part 410, a head part 420, a nozzle 430, and the pump assembly 300.

The container part 410 may provide an accommodation space in which contents are accommodated. The contents accommodated in the container part 410 may be discharged to the outside through the nozzle 430 or the like to be used by a user. Here, the contents may be, for example, a cosmetic or medicine, but are not limited thereto, and may include materials of various types or ingredients which may be accommodated in the container part 410 and discharged through the nozzle 430. Formulations of contents such as liquid, gel, powder, and the like may also vary. Further, the container part 410 is shown as a bottle type, but this is only an example, and various types of container part 410 such as a tube type, a bottle type, and the like may be applied.

The pump assembly 300 (for example, the blade part 351 of the cylinder 310) may be seated on an upper end of the container part 410. The contents accommodated in the container part 410 may be discharged to the outside by the pump assembly 300. The head part 420 may be coupled to an outer side of a spout part 411 of the container part 410. The head part 420 may have a space in which the pump assembly 300 is provided inward and/or outward, may provide a space where the nozzle 430 is partially movable, and may pressurize and fix the pump assembly 300 through coupling between the head part 420 and the container part 410.

The nozzle 430 may receive an external force from a user and then transfer the external force to the pump assembly 300, and discharge the contents discharged from the pump assembly 300 to the outside. The nozzle 430 may vertically move by receiving the external force from the user in an upward direction, and may come into contact with the piston rod 340 in a downward direction. Ascending and descending of the nozzle 430 may cause ascending and descending of the piston rod 340.

According to the present disclosure, an elastic member is formed of a soft plastic material to allow costs to be reduced through a simple structure, and to be more eco-friendly by solving the problem of having to separate and discard the elastic member with components of the pump assembly.

Further, according to the present disclosure, the elastic member can have a sufficient elastic force and durability through an upper support, a lower support, and a connection part which connects the upper support and the lower support and in which peaks and valleys are repeatedly formed.

As described above, although the embodiments are described by the limited embodiments and drawings, various changes and modifications may be performed by those skilled in the art from the above description. Further, the embodiments may be combined to be operated as necessary. Accordingly, equivalents of other implementations, other embodiments, and the claims are included within the scope of the following claims.

What is claimed is:

1. A pump assembly comprising:
an elastic member comprising:
a first support;
a second support; and
a connection part connecting the first support and the second support and comprising a plurality of peaks and valleys alternatingly disposed in an outward direction,
wherein the plurality of peaks and valleys are configured to be bent when the elastic member is pressurized;
a sealing part accommodating the elastic member; and
a stem coupled to a piston rod and configured to ascend and descend together with the piston rod,
wherein the elastic member is disposed between the stem and the sealing part and is configured to provide an elastic force to the stem from the sealing part,
wherein a blade part is defined in the stem configured to restrain an upper end of the elastic member and comprises at least one air path configured to release compression and expansion of inner air generated during compression and decompression of the elastic member.

2. The pump assembly of claim 1, wherein the elastic member is configured to be accommodated in the pump assembly in a partially compressed state.

3. The pump assembly of claim 1, wherein the elastic member is formed of at least one among polyetheretherketone (PEEK), polycarbonate (PC), polyoxymethylene (POM), polyketone (POK), polybutylene terephthalate (PBT), polypropylene (PP), polyethylene (PE), polyoxypropylene (POP), a polyolefin elastomer (POE), and ethylene octene/butene copolymers.

4. The pump assembly of claim 1, wherein sizes of each of the plurality of peaks and valleys increase in a longitudinal direction.

5. The pump assembly of claim 1, wherein the connection part is a bellows type,
wherein the connection part is defined along a circumference of the elastic member, and
wherein a circumferential surface of the connection part is sealed.

6. The pump assembly of claim 1, wherein the second support has a two-step structure,
wherein the two-step structure has a first step structure and a second step structure,
wherein the first step structure is defined on a distal portion of the two-step structure and has a first-outer-side-wall and a first-inner-side-wall, and
wherein the second step structure is defined on a closer portion of the two-step structure and has a second-outer-side-wall and a second-inner-side-wall.

7. The pump assembly of claim 6, wherein each step of the two-step structure comprises a step-through-hole having a buffer space inside the first step structure, and the second step structure is inwardly bent to the buffer space when the elastic force is horizontally or vertically pressured.

8. The pump assembly of claim 6, wherein a diameter of the first-outer-side-wall of the first step structure is greater than a diameter of a peak of the plurality of peaks and valleys.

9. The pump assembly of claim 8, wherein a horizontal margin is created by a difference between the diameter of the first-outer-side-wall of the first step structure and the diameter of the peak of the plurality of peaks and valleys, and
wherein the connection part is compressed or decompressed without interference of other components of the pump assembly by being compressed or decompressed in the horizontal margin.

10. The pump assembly of claim 6, wherein a distance from the first-outer-side-wall of the first step structure to the first-inner-side-wall of the second step structure is greater than a height of the two-step structure.

11. The pump assembly of claim 6, wherein a distance from the first-outer-side-wall to the first-inner-side-wall of the first step structure is greater than a height of the first step structure.

12. The pump assembly of claim 1, wherein the second support has a multi-step structure, wherein each step of the multi-step structure has an inner side wall and an outer side wall, and a diameter of each step of the multi-step structure increases towards a distal portion of the elastic member, and
wherein the elastic member has a through hole penetrating the first support, the connection part, and the second support along axial direction of the elastic member, and
wherein a space is defined by the through hole configured to accommodate the pump assembly.

13. The pump assembly of claim 1 further comprising:
a cylinder vertically open and having a hollow therein;
a seal cap disposed on an inner wall of the cylinder; and
the piston rod having an piston-inlet opened and closed by the seal cap disposed in a lower end of the piston rod and a path connected to the piston-inlet disposed at the upper end of the piston rod,
wherein the sealing part is at least partially inserted into the cylinder and is configured to restrain an ascent of the seal cap, and
wherein the elastic member is disposed between the stem and the sealing part and is configured to provide the elastic force to the stem from the sealing part.

14. The pump assembly of claim 13, wherein the blade part is defined by protruding outward along a circumference of an upper end of the stem configured to support the upper end of the elastic member,
wherein a downwardly bent portion is defined along a circumference of the blade part and supports the elastic member configured to prevent separation of the elastic member.

15. The pump assembly of claim 14, wherein the at least one air path of the blade part is defined on at least one region of the blade part being open.

16. The pump assembly of claim 13, wherein the sealing part comprises:

a sidewall disposed to the cylinder and is configured to prevent an outward separation of the elastic member; and a base part defined on a lower end of side wall, wherein an upper surface of the base part supports a lower end of the elastic member.

17. The pump assembly of claim 13, wherein the cylinder has an inlet communicating with a container and a valve preventing backflow, and wherein the valve opens the inlet when an inner pressure of cylinder changes to a negative pressure.

18. The pump assembly of claim 13, wherein a lower portion of the piston rod is surrounded by an inner surface of the seal cap sealing the piston-inlet of the piston rod and an upper portion of the piston rod is connected to the stem.

* * * * *